United States Patent [19]
Rune

[11] Patent Number: 6,038,439
[45] Date of Patent: Mar. 14, 2000

[54] METHOD AND DEVICE IN A TELECOMMUNICATIONS SYSTEM

[75] Inventor: Johan Rune, Lidingö, Sweden

[73] Assignee: Telefonaktiebolaget LM Ericsson, Stockholm, Sweden

[21] Appl. No.: 08/923,923

[22] Filed: Sep. 5, 1997

[30] Foreign Application Priority Data

Sep. 10, 1996 [SE] Sweden .................................. 9603281

[51] Int. Cl.$^7$ .................................................. H04M 11/00
[52] U.S. Cl. ......................... 455/406; 455/435; 455/432; 379/114
[58] Field of Search ..................... 455/406, 407, 455/408, 414, 435, 432; 379/114, 115, 121, 130

[56] References Cited

U.S. PATENT DOCUMENTS

| | | | |
|---|---|---|---|
| 5,297,189 | 3/1994 | Chabernaud | 379/58 |
| 5,396,543 | 3/1995 | Beeson, Jr. et al. | 348/560 |
| 5,711,006 | 1/1998 | Brochu et al. | 455/445 |
| 5,799,072 | 8/1998 | Vulcan et al. | 379/114 |
| 5,835,856 | 11/1998 | Patel | 455/406 |
| 5,848,138 | 12/1998 | Sarpola et al. | 455/407 |
| 5,862,471 | 1/1999 | Tiedermann, Jr. et al. | 455/406 |
| 5,867,780 | 2/1999 | Malackowski et al. | 455/414 |
| 5,873,030 | 2/1999 | Mechling et al. | 455/408 |
| 5,873,034 | 2/1999 | Alperovich et al. | 455/432 |
| 5,884,157 | 3/1999 | Karmi | 455/406 |

FOREIGN PATENT DOCUMENTS

| | | |
|---|---|---|
| 9501497 | of 0000 | Sweden . |
| WO94/23530 | 10/1994 | WIPO . |
| WO96/34503 | 10/1996 | WIPO . |
| WO96/34504 | 10/1996 | WIPO . |

OTHER PUBLICATIONS

Zaid M., "Personal Mobility in PCS", XP 000478092, IEEEE Personal Communications, 4th quarter, 1994.

Eleftheriadis & Theologou, "User profile identification in future Mobile Telecommunication systems", XP 000606584, IEEE Network, Sep./Oct. 1994.

Colloquium on Mobile Communications Towards the Next Millenium . . . , vol., May 1996, (London, GB), P. A. Ramsdale, "Personal Communications Network Evolution", pp. 4, 5–pp. 7, 8.

*Primary Examiner*—Reinhard J. Eisenzopf
*Assistant Examiner*—Duc Nguyen
*Attorney, Agent, or Firm*—Burns, Doane, Swecker & Mathis, L.L.P.

[57] ABSTRACT

The present invention relates to a charging method in a telecommunications system (TS) when information is being transmitted in a generic radio based access network (GRAN) to which two or more service networks (SN1, SN2, SN3) with different specified standards are connected. The access network comprises radio control units (RNC1–RNC5), each of which constitutes a connection point between the access network (GRAN) and at least one of the service networks (SN1–SN3). Charging parameters (DP10–DP12, DP20, DP30–DP33) representing charging agreements for the service networks' (SN1–SN3) utilization of the access network (GRAN) are stored in the radio control units. The method also comprises the following additional steps:

A transmission request (B0) for information transmission is sent from the telecommunications station (TA) to the home network (SN1).

A charging agreement for the requested information transmission is selected in the home network (SN1).

Transmission of a connection request (B1a) for the establishment of a connection to the mobile unit (TE) from the home network (SN1) to a first radio control unit (RNC1) constituting a connection point between the access network (GRAN) and the home network (SN1);

Transmission of a charging agreement pointer (P1a) from the home network (SN1) to the first radio transmission unit (RNC1). The pointer (P1a) points out charging parameters (DP11) representing the selected charging agreement.

27 Claims, 6 Drawing Sheets

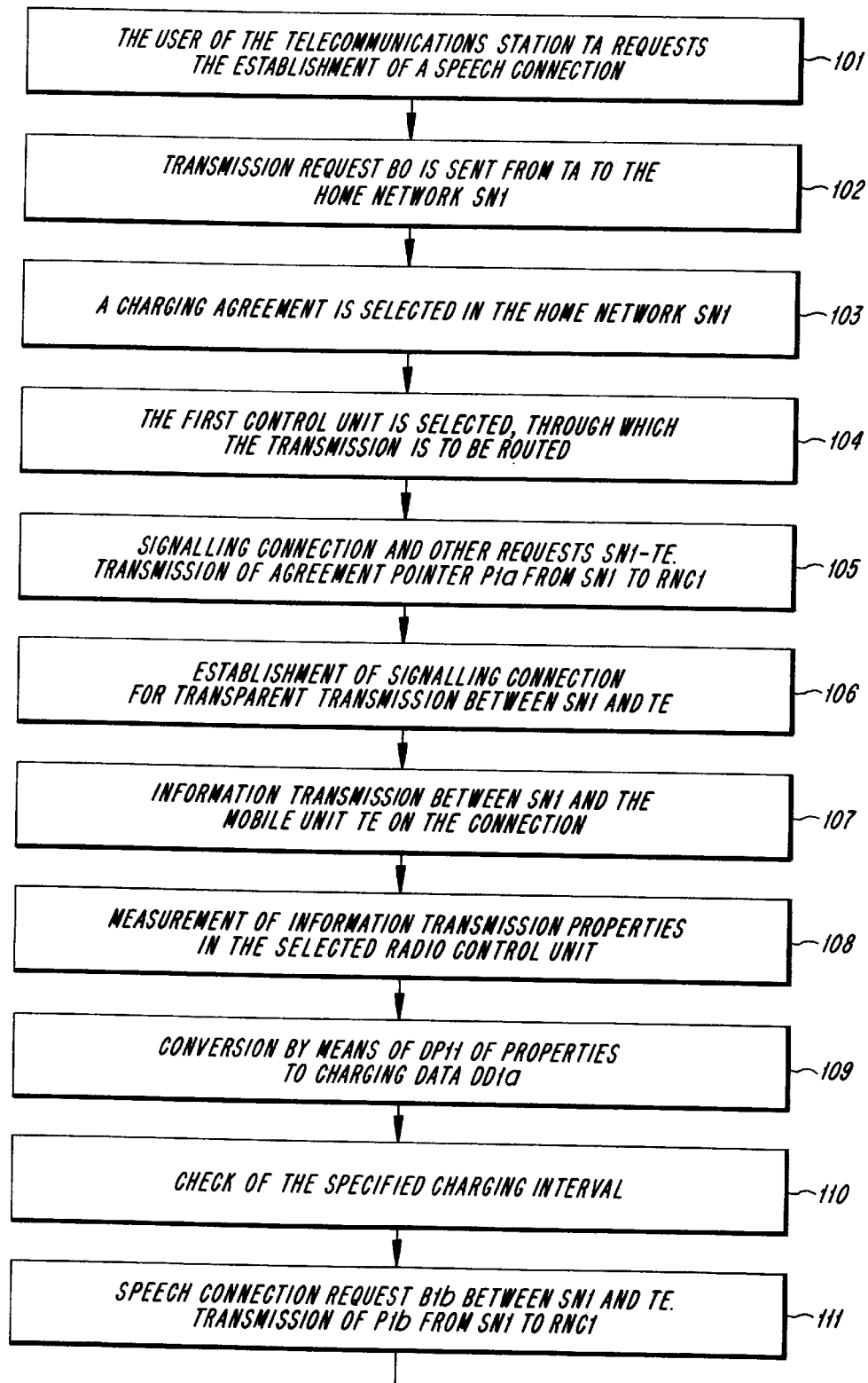

6,038,439

METHOD AND DEVICE IN A TELECOMMUNICATIONS SYSTEM

TECHNICAL FIELD

The present invention relates to a charging method for transmission of information in a generically radio based access network to which at least two different service networks are connected.

STATE OF THE ART

The need for mobility and flexibility in transmission of telecommunications information is constantly increasing, causing increased requirements on telecommunications networks to cover larger and larger geographical areas. A natural solution when expanding the geographical range of a telecommunications network is to expand the network. The expansion is then optimized to suit the specified standard of the network. Since the expanded network can only be used by the telecommunications network for which the expanded network is intended, the whole network configuration is often handled by only one operator. Charging between operators thus does not occur. Only conventional charging between the operator and the subscriber is used.

A solution to expand the range of several telecommunications networks is shown in the Swedish patent application SE 9501497, where telecommunications networks, so called service networks with different specified standards have been connected to one common radio based access network. According to the Swedish application, the different service networks can be, for example, GSM (Global System for Mobile Communication), PSTN (Public Switched Telephone Network) or VOD (Video on Demand) type networks. The access network comprises different signal nodes that can establish connections to radio units located in the access network. Examples of nodes are radio control units and radio base stations. In the access network there are radio units belonging to the different service networks, i.e. communicating with the same specified standard as the service networks. Each service network can, according to the Swedish application, use the access network for transfer of information to or from a radio unit belonging to the respective service network. In the information transfer, signals are transported transparently through the access network between a radio unit and its service network via signal carriers in the access network. Since the different telecommunications networks, both service network s and access networks are usually handled by different operators, charging is required between the operators when a subscriber belonging to th e service network utilizes the access network for information transfer.

SUMMARY OF THE INVENTION

The present invention relates to problems related to charging that arise when several service networks with different specified standards have been connected to a common radio based access network. A problem addressed by the invention is the problem of handling of costs when an operator of a certain service network is to be charged for the use of the access network of another operator. The problem occurs independently of whether the information transfer was initiated from the service network or the initiation was made from a radio unit in the access network, said radio unit belonging to the service network. Another problem solved by the invention is the problem of achieving flexible charging in spite of the complex network structure.

According to the invention, the above mentioned problems are solved by letting charging agreements be signed between a service network operator and an operator of the access network, and then storing parameters representing the contents of the different agreements in one or more nodes in the access network. When information transfer is initiated, which is done either from the service network or from a radio unit belonging to the service network, parameters in a selected node in the access network are pointed out, said parameters representing a charging agreement according to the above. Information transfer properties such as, for example, total transmission time, are then stored in the node, and charging data may be calculated.

An object of the invention is to provide a unified method of charging in an access network to which several different service networks may be connected.

Another object of the invention is to provide a flexible charging method where different charging agreements are selected in dependence of the desired transmission type.

Yet another object of the invention is to keep a simple interface between access networks and service networks.

Different embodiments of the method according to the invention are disclosed in patent claims 1, 2 and 4. An apparatus for carrying out the method according to the patent claims is disclosed in patent claims 11 and 12.

Thus, advantages of the invention are that it enables a unified and flexible charging method while keeping the simplicity and the stability in the interface between access networks and service networks.

BRIEF DESCRIPTION OF THE DRAWINGS

FIGS. 3a and 3b are a flow chart of the method for charging when the transfer of information is initiated from the service network.

PREFERRED EMBODIMENT

Figure 1:
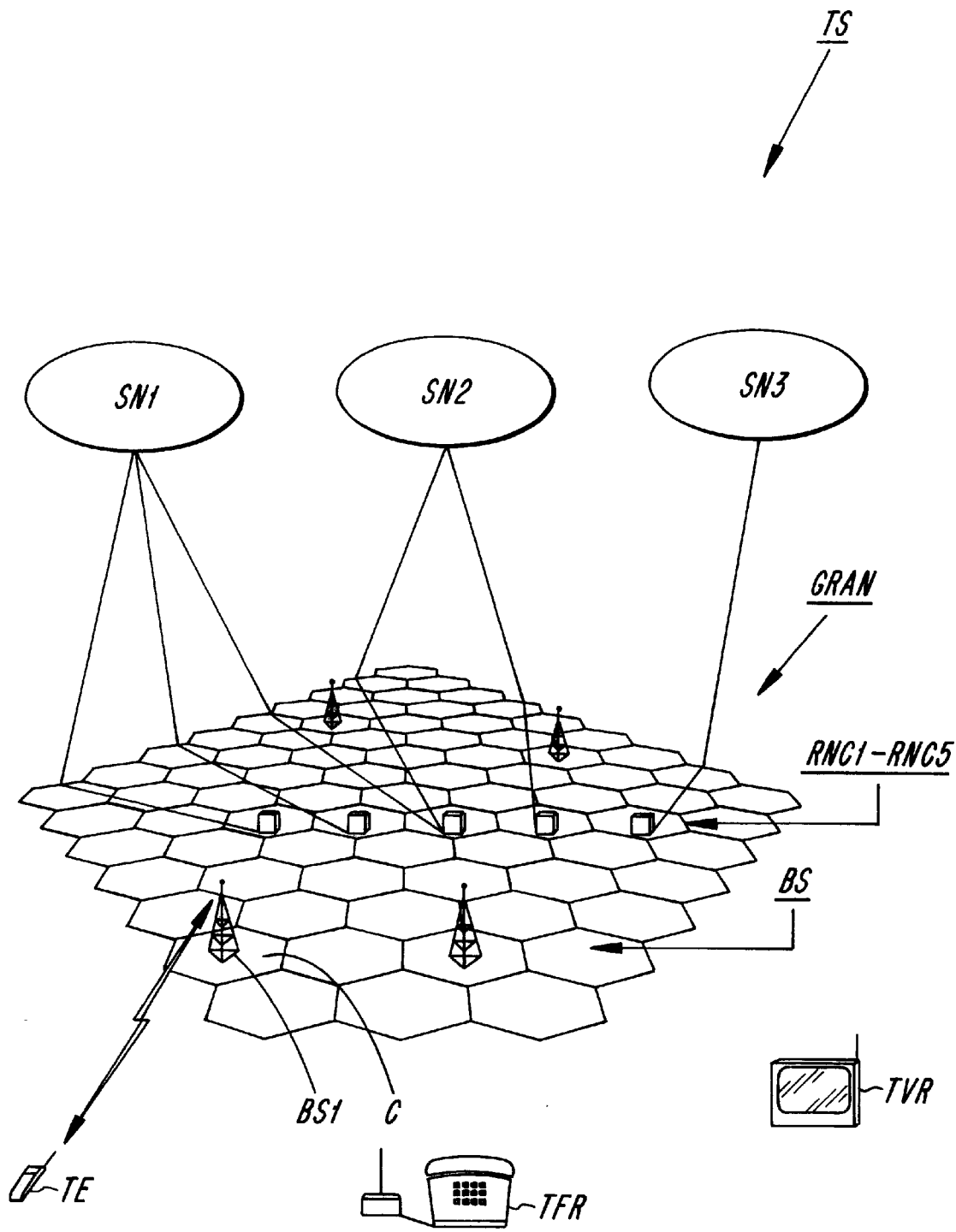
FIG. 1 is a perspective view of a telecommunications system comprising an access network to which a number of service networks are connected.

FIG. 1 shows a telecommunications system TS comprising a radio based access network GRAN. The telecommunications system, which is already described in the Swedish patent application SE 9501497 will only be briefly described in connection with the figure. The access network GRAN comprises a number of base stations, in FIG. 1 denoted by the common reference BS. Each of the base stations covers a geographical area, a so called cell C, with radio signals. In FIG. 1 only a few of the base stations BS present in the access network GRAN are shown. The base stations BS are connected to radio control units, in FIG. 1 denoted by the common reference RNC1–RNC5. It has been chosen not to show the connections between radio control units and base stations in the figure. The radio control units RNC1–RNC5 distribute signals to and from the connected base stations BS. The telecommunications system TS in FIG. 1 comprises three service networks SN1, SN2 and SN3. Of the service networks SN1–SN3 shown in FIG. 1 a first service network SN1 is a GSM (Global System for Mobile Communication) network, a second service network SN2 is a PSTN (Public Services Telephone Network) and a third service network SN3 is a VOD (Video on Demand) network. The service network SN1 is a mobile telecommunications network used to transport speech or data signals to and from a mobile telecommunications unit belonging to the mobile telecommunications network. The service network SN2 is a public telecommunications network used to transport signals to and from a subscriber belonging to the public telecommunications network. The service network SN3 is used, for example, by a video hire supplier to transport signals to and from a subscriber belonging to the public telecommunications network at a charge. Each service network uses different specified signalling protocols. A specified network standard is defined by the signalling protocol used by the network for communication within the network, that is the "language" used by signalling nodes within the network to communicate with each other. Examples of protocols are MAP and BSSAP, both of which are used in the mobile telecommunications network GSM. The signalling protocols are well described in the specified standard for the respective network.

Each service network SN1, SN2 and SN3 in the telecommunications system TS is connected to the access network GRAN through at least one of the radio control units RNC1–RNC5. The telecommunications system also comprises radio units TE, TFR and TVR which are found within the radio coverage area of the access network GRAN. Each of the radio units can establish a connection to base stations BS in the access network GRAN.

Data transport between one of the radio units and a selected service network takes place on so called signal carriers. Examples of different signalling nodes in the access network are the radio control units RNC1–RNC5, the base stations BS and the radio units TE, TFR and TVR. A radio unit comprises an access part and a service part. The access part belongs to the access network GRAN and handles the signalling required to establish a signal carrier in the access network GRAN between the radio unit and the service network to which the unit belongs. The service part belongs to one of the service networks SN1, SN2 or SN3 and receives and transmits signals according to the specified standard of the service network, on the established signal carriers.

According to the Swedish application, a signal carrier is thus established through the access network, between the radio unit and the service network of the unit, the so called home network. A message can then be transported via the signal carrier through the access network between the service part of the radio unit and the service network with which a user of the radio unit has a subscription. The message is created in accordance with the standard of the home network.

Figure 2:
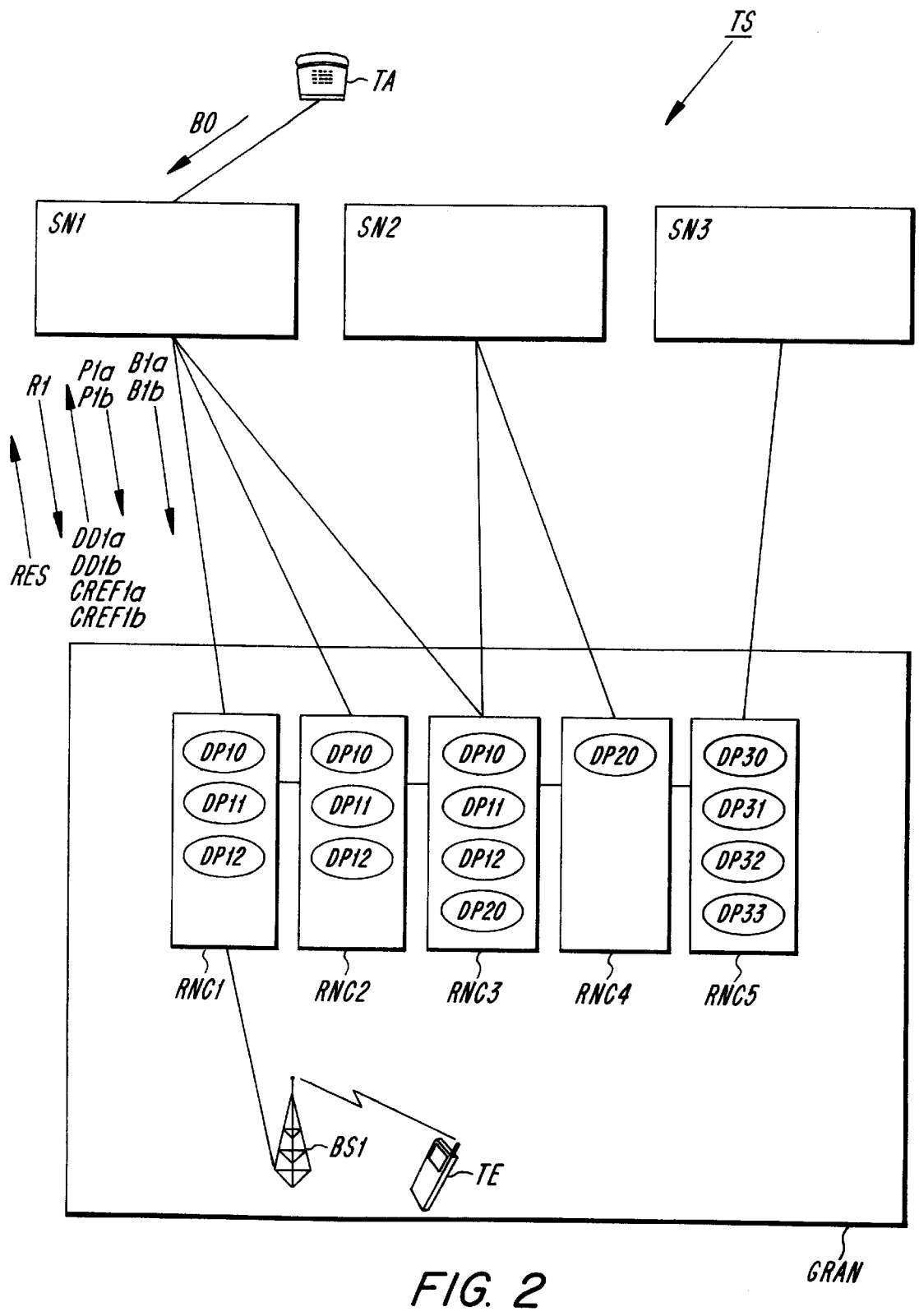
FIG. 2 is a block diagram of the telecommunications system shown in FIG. 1 and a method for charging when the information transfer is initiated from one of the service networks.

FIG. 2 shows the telecommunications system TS previously mentioned in connection with FIG. 1. The telecommunications system comprises the service networks SN1, SN2 an SN3 as well as the access network GRAN. According to the embodiment to be described in the following, the access network is handled by an access network operator and the three service networks are handled by three different service network operators. The access network comprises the previously shown radio control units RNC1, RNC2, RNC3, RNC4 and RNC5. The radio control units can control a number of base stations in the access network GRAN. A telecommunications station TA is connected to the first service network SN1. The service network is, as previously mentioned, a GSM network for mobile telephony. The telecommunications station is connected to the mobile telecommunications network via a fixed telecommunications network not shown in FIG. 2. The first service network SN1 is connected to the first radio control unit RNC1, the second radio control unit RNC2 and the third radio control unit RNC3. A base station BS1 is connected to the first radio control unit RNC1. The second service network SN2 too is connected to the third radio control unit RNC3. The second network SN2 is also connected to the fourth radio control unit RNC4. The third service network SN3 is connected to the fifth radio control unit RNC5. In FIG. 2 a mobile radio unit TE, which can establish a radio connection with a base station BS1 in the access network GRAN, is shown. The base station BS 1 is connected to the first radio control unit RNC1. A user of the radio unit has a subscription with an operator of one of the service networks, the so called home network SN1.

In the following a charging method for the telecommunications system TS shown above will be shown in connection with FIG. 2. The method starts with a charging agreement being signed between the access network operator and the operators of the different service networks SN1, SN2 and SN3. Each agreement signed between the operator of the access network and an operator of a service network is represented by charging parameters stored in the radio control unit or units connecting the access network with the service network for which the agreement is valid. A service network operator can sign several different charging agreements with the access network operator. A charging agreement comprises tariffs which are the basis for charging. The tariffs are based, for example, on the time the access network GRAN is utilized or the amount of information transmitted in the access network. A charging agreement can also comprise instructions for how often the access network is to send charging data for utilization of the access network to the service network or charging consequences in case of a connection being interrupted too soon. Since information transmission requires a connection to be established, tariffs for the establishment of channels is also covered by the charging agreement.

According to the embodiment, an operator of the first service network has signed three charging agreements with the access network operator, so called first, second and third charging agreements. The charging agreements are represented by a first set of charging parameters DP10, an second set of charging parameters DP11 and a third set of charging parameters DP12. The charging parameters DP10, DP11 and DP12 are stored in the three radio control units RNC1, RNC2 and RNC3, which constitute connection points between the first service network SN1 and the access network GRAN. According to the embodiment, only three different charging agreements have been signed, but more charging agreements are possible, between which the service network operator can choose when information transmission through the access network is desired. An operator of the second service network SN2 according to the embodiment has only signed one charging agreement with the access network operator. The agreement is represented by charging parameters DP20 which are stored in the third as well as the fourth radio control unit RNC3 and RNC4. In the same way an operator of the third service network SN3 has signed four charging agreements with the access network operator. The agreements are represented by charging parameters DP30, DP31, DP32 and DP33, which are stored in the fifth radio control unit RNC5. The parameters determine which properties are to be measured for charging purposes, for a connection. Some examples of parameters representing the agreements are the parameters for the previously mentioned tariffs. The charging agreements can comprise many different parameters, and may even comprise more complicated instructions about how the charging and the measurements of charging data are to be carried out. For example load dependent tariffs, and at what points in time the load is to be measured, may be described. Load dependent tariffs means that the tariffs are dependent on the total traffic load to which the relevant part of the access network is being exposed at any given time. Another example of what may be described is a possible fee for moving the connection between two different radio control units.

The method now to be described shows the charging between the access network operator and the operator of the first service network SN1. The method is illustrated in connection with FIG. 2. Arrows between different signalling nodes TA, SN1, RNC1 shown in the figure symbolize messages sent between the different nodes. The method, which comprises the above mentioned storing of charging parameters, also comprises the following additional steps:

A user of the permanently connected telecommunications station TA requests the establishment of a speech connection.

A transmission request B0 is sent from the permanently connected telecommunications station TA. The transmission request BO is a request from the permanently connected telecommunications station TA for establishment of a connection to the mobile terminal unit TE, which has a subscription to the first service network SN1. The transmission request is routed by means of a routing method through the fixed telecommunications network from the telecommunications station TA to the home network SN1.

The transmission request B0 is received in the home network. A charging agreement is selected in the home network SN1. The selected agreement, which according to the example is the second charging agreement, is selected in accordance with the requested transmission. According to the example, the selection is based on the desired necessary speed and the necessary delay properties for the requested transmission.

A radio control unit RNC1 is selected, through which the information transmission is to be routed. The selected radio transmission unit RNC1 is selected among the three radio control units RNC1, RNC2 and RNC3 constituting connection points between the home network and the access network GRAN. The selected radio control unit is the most suitable of the three to route the information through, with respect to the position of the mobile unit TE.

A first connection request B1a for establishment of a first connection between the home network SN1 and the mobile unit TE, with properties suitable for signalling between the home network SN1 and the mobile unit TE, is sent from the home network SN1 to the selected radio control unit RNC1.

A first charging agreement pointer P1a is sent from the home network SN1 to the selected radio control unit RNC1 together with the above mentioned request B1a for the establishment of a first connection. The pointer P1a points out the charging parameters DP11 representing the selected charging agreement.

A connection for transparent transmission is established between the home network SN1 and the called mobile unit TE. According to the example the connection is used for signalling between the home network SN1 and the mobile unit TE in accordance with the specified signalling protocol of the home network SN1.

Information transmission takes place between the home network SN1 and the mobile unit TE on the established signalling connection. Since the home network SN1 is a GSM network, the information transfer takes place in accordance with a signalling protocol DTAP (Direct Transfer Application Part).

Measurements are made in the selected radio control unit RNC1 and, if need be, in the base station BS1 and the access part of the terminal part of the access network GRAN as well, of information transmissions properties in information transmission between the home network SN1 and the mobile unit TE. Examples of information transmission properties are bandwidth and the amount of information transmitted.

Conversion in the selected radio control unit RNC1 of measured information transmission properties to charging data DD1a. The conversion is made by means of the charging parameters DP11.

The occurrence of a specified charging interval is checked by means of the charging parameters DP11. According to the specification in the agreement, charging is requested directly after the interruption of the signalling connection.

A second connection request B1b, for the establishment of a second connection between the home network SN1 and the mobile unit TE, with suitable properties for the transmission of speech, is sent from the home network SN1 to the selected radio control unit RNC1.

A second charging agreement pointer P1b is sent from the home network SN1 to the selected radio control unit RNC1 together with the above mentioned request B1b.

The pointer P1b points out the charging parameters DP12 representing the selected charging agreement.

A second connection for transparent transmission is established between the home network SN1 and the called mobile unit TE.

Information transmission takes place between the home network SN1 and the mobile unit TE on the established speech connection. According to the example the information transmission is comprised of speech.

Measurements are made in the selected radio control unit RNC1 and, if need be, in the base station BS1 and in the access part of the terminal part of the access network GRAN as well, of measured information transmission properties in information transmission between the home network SN1 and the mobile unit TE on the established speech connection.

Conversion in the selected radio control unit RNC1 of measured information transmission properties to charging data DD1b. The conversion is made by means of the charging parameters DP12.

The occurrence of a specified charging interval is checked by means of the charging parameters DP12. According to the specification of the agreement the charging is requested directly after the interruption of the speech connection.

The speech connection is disconnected when the information transmission has been completed.

The charging data DD1b is sent from the access network GRAN to the home network SN1.

The signalling connection is disconnected when the information transmission has been completed.

The charging data DD1a is sent from the access network GRAN to the home network SN1.

As mentioned above, certain parts of the signalling are further described in the Swedish application SE 9501497. Some method steps which are less important to the invention have been omitted on purpose, in an attempt to clarify the idea behind the invention. The order in which the method steps shown above are carried out can also vary to some degree without affecting the idea of the invention. Certain variations are also perceivable, for example that the telecommunications station TA is located in the home network SN1, or that the transmission request is sent from the home network SN1 automatically without being initiated by a user of a telecommunications station. Another possible variation of the method would be to let the home network check the charging data DD1a and DD1b received from the access network. This implies, as shown in FIG. 2, that connection references CREF1a and CREF1b, identifying the signalling connection and the speech connection respectively, are transmitted from the access network to the home network when a request for the establishment of the respective connection is approved. The same connection references, CREF1a and CREF1b respectively, are then sent from the access network to the home network together with the charging data DD1a and DD1b, respectively. The home network must also register the information transmission for the respective connections together with the respective connection reference in order to be able to later compare the result with the charging data DD1a and DD1b respectively. As a further variation on the first example, it is perceivable to let a negotiation procedure take place before the establishment of the connection. The negotiation procedure takes place after the transmission request B0 has been received, and comprises the following steps:

The home network SN1 initiates the negotiation procedure by sending a resource request R1 to the access network GRAN, as a part of a request B1a for the establishment of a signalling connection. The resource request R1 comprises the desired traffic resources in the access network, such as the desired bandwidth.

The access network GRAN decides whether or not the request for traffic resources can be met by the access network. This decision is based on the resources currently available in the access network.

A result message, RES, is sent from the access network GRAN to the home network SN1. If resources are available, the procedure proceeds as previously shown above, after the reception of the result message in the home network. If the resources are not available, the resource request is denied.

Figure 3B:
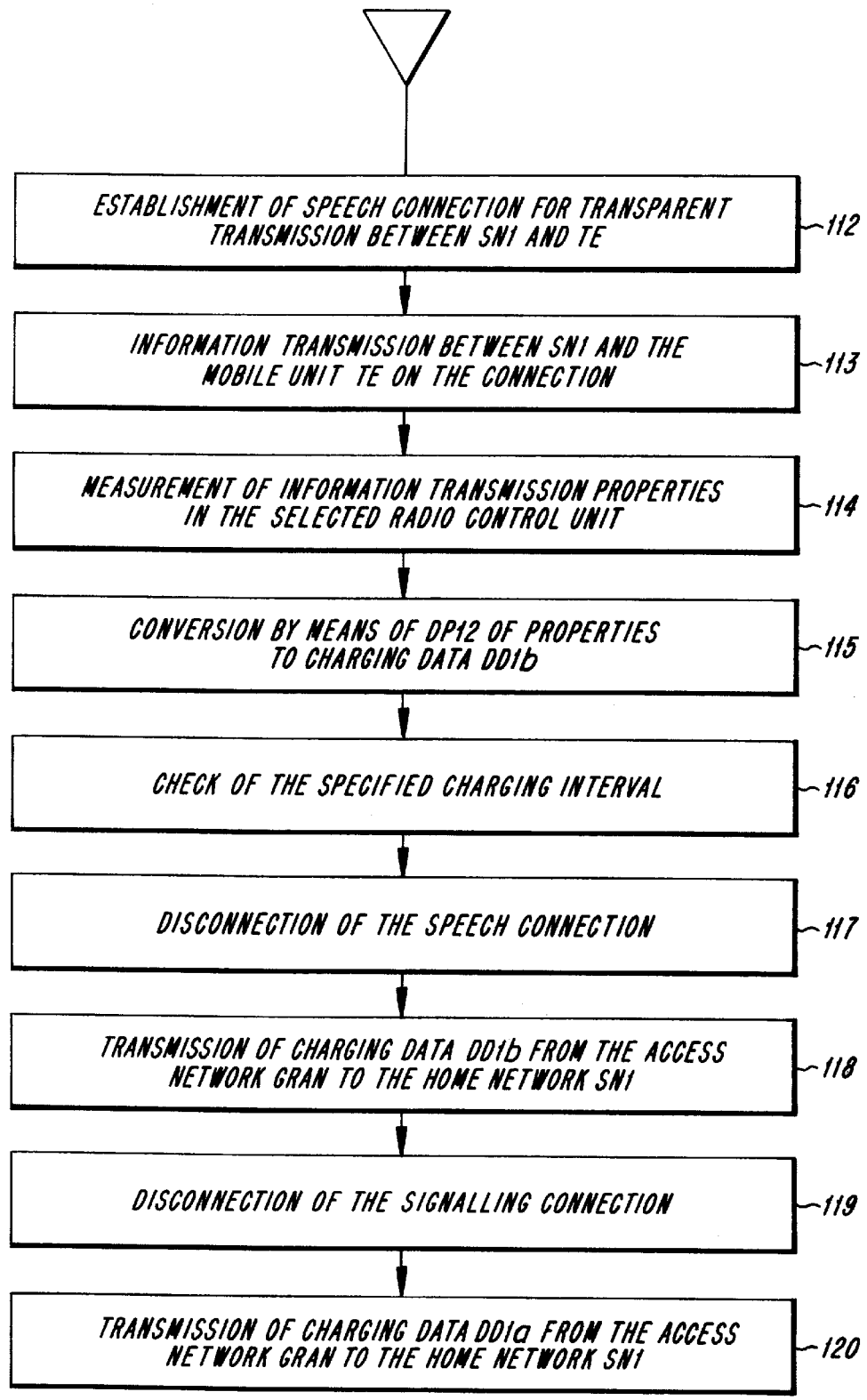

In FIG. 3 a flow chart, briefly describing the most important steps in the previously shown method, is shown. FIG. 3 is intended to be considered together with FIG. 2. The flow chart comprises the following steps:

The user of the permanently connected telecommunications station TA requests the establishment of a speech connection, according to block 101.

The transmission request B0 is sent from the permanently connected telecommunications station TA to the home network SN1, according to block 102.

The transmission request B0 is received in the home network. A charging agreement is selected in the home network SN, according to block 103.

The first radio control unit RNC1 is selected, through which the information transmission is to be routed, according to block 104.

A request B1a for the establishment of a signalling connection between the home network SN1 and the mobile unit TE, and the agreement pointer P1, a is sent from the home network SN1 to the selected radio control unit RNC1, according to the block 105.

A signalling connection for transparent transmission is established between the home network SN1 and the called mobile unit TE, according to block 106.

Information transmission takes place between the home network SN1 and the mobile unit TE on the established signalling connection, according to block 107.

A measurement is made in the selected radio control unit of information transmission properties in information transmission between the home network SN1 and the mobile unit TE, according to block 108.

Conversion in the selected radio control unit RNC1 of measured information transmission properties to charging data DD1a, according to block 109. The conversion is carried out by means of the charging parameters DP11.

The occurrence of a specified charging interval is checked by means of the charging parameters DP11, according to block 110. According to the specification of the agreement, charging has been requested directly after the interruption of the signalling connection.

A request B1b for the establishment of a speech connection between the home network SN1 and the mobile unit TE and the agreement pointer P1b is transmitted from the home network SN1 to the selected radio control unit RNC1, according to block 111.

A speech connection for transparent transmission is established between the home network SN1 and the called mobile unit TE, according to block 112.

Information transmission takes place between the home network SN1 and the mobile unit TE on the established speech connection, according to block 113.

Measurement in the selected radio control unit of information transmission properties in information transmission between the home network SN1 and the mobile unit TE, according to block 114.

Conversion in the selected radio control unit RNC1 of measured information transmission properties to charging data DD1b, according to block 115. The conversion is made by means of the charging parameters DP12.

The occurrence of a specified charging interval is checked by means of the charging parameters DP12, according to block 116. According to the specification of the agreement, charging is requested directly after the interruption of the speech connection.

The speech connection is disconnected when the information transmission is complete, according to block 117.

The charging data DD1b is sent from the access network GRAN to the home network SN1, according to block 118.

The signalling connection is disconnected when the information transmission is complete, according to block 119.

The charging data DD1a is sent from the access network GRAN to the home network SN1, according to block 120.

Figure 4:
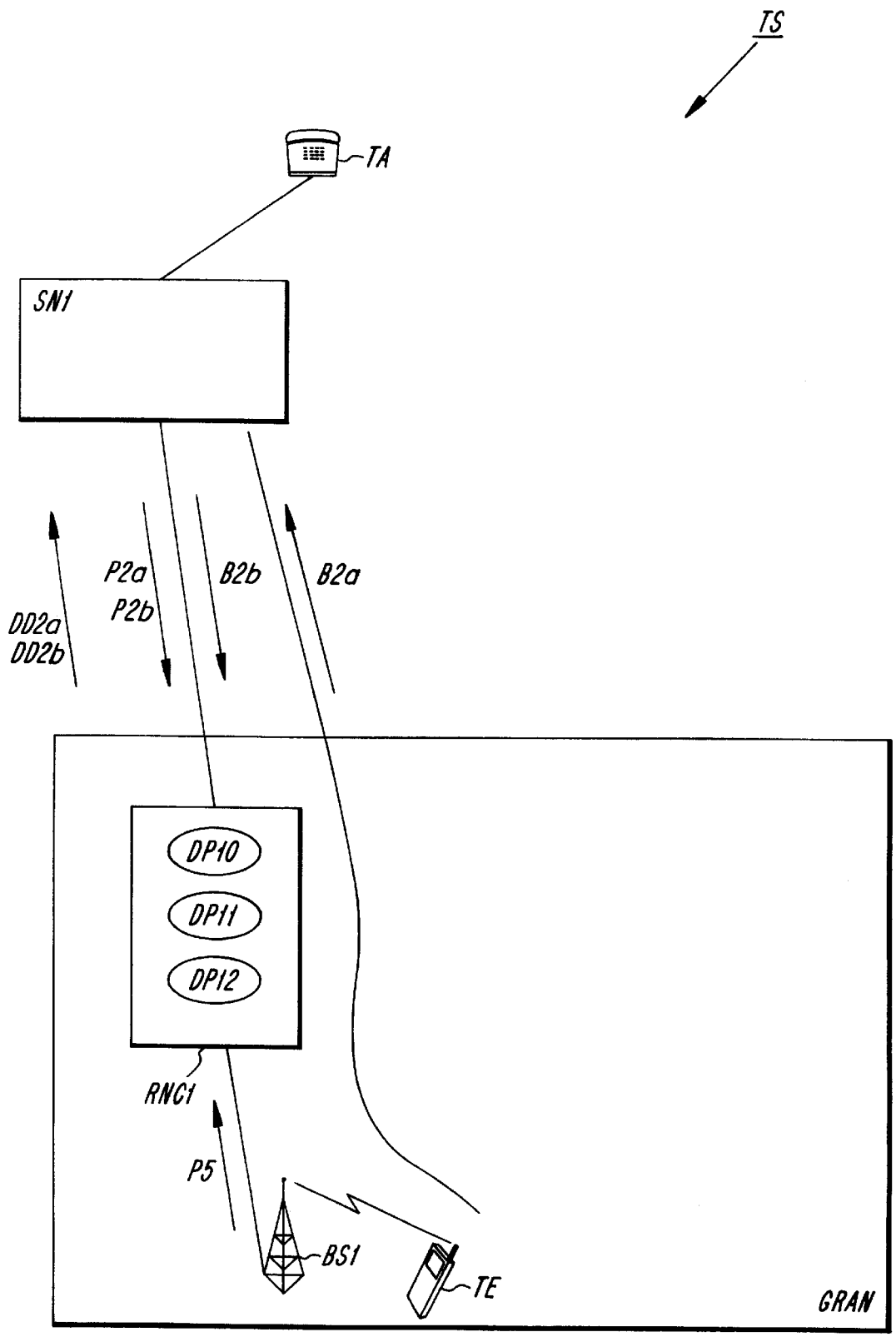
FIG. 4 is a block diagram of the telecommunications system shown in FIG. 1 and a method for charging when the transfer of information is initiated from a radio unit in the access network, said radio unit belonging to one of the service networks.

In the following a further implementation example will be shown. The second example is illustrated together with FIG. 4 and shows a charging procedure when the previously mentioned mobile unit initiates the connection establishment. FIG. 4 shows a part of the network configuration in the telecommunications system TS previously shown in FIG. 2. In FIG. 4 the same mobile unit TE as before, and its home network SN1, are seen. As previously mentioned, the access network GRAN comprises five radio control units, of which only the first radio control unit is shown in FIG. 4. As previously mentioned, the charging parameters DP10, DP11 and DP12 have been stored in the first radio control unit. The permanently connected telecommunications station TA is connected to the home network SN1. The home network SN1 is connected to the access network GRAN and the base station BS1 in the access network is connected to the first radio control unit RNC1.

The method to be described below thus shows the charging procedure when the mobile unit TE initiates the call connection. Apart from the storing of the charging parameters the procedure comprises the following additional steps:

A user of the mobile terminal unit TE requests the establishment of a speech connection. As previously mentioned, the mobile unit TE has a subscription to one of the service networks, said network as before denoted the home network SN1. The traffic channel is requested between the mobile unit TE and the home network SN1. A third connection request B2a for the establishment of a first connection between the mobile unit TE and the home network SN1, with suitable properties for signalling between the mobile unit TE and the home network SN1, is sent to the access network GRAN from the mobile unit TE and, via the access network GRAN, to the home network SN1.

A charging agreement for the requested information transmission is selected in the home network.

A third charging agreement pointer P2a is sent from the home network SN1 to a first radio control unit RNC1 constituting a connection point between the access network GRAN and the home network SN1. The pointer P2a points out the charging parameters DP10 representing the selected charging agreement.

A signalling connection is established in the access network GRAN between the home network SN1 and the mobile unit TE.

Information transmission takes place between the home network SN1 and the mobile unit TE.

Registration in the first radio control unit RNC1 in the access network GRAN of measured information transmission properties between the home network SN1 and the mobile unit TE.

Conversion by means of the charging parameters DP10 of the measured information transmission properties to charging data DD2a.

Registration of the desired charging interval for the signalling connection by means of the charging parameters DP10.

A fourth connection request B2b for the establishment of a second connection between the home network SN1 and the mobile unit TE with properties suitable for the transmission of speech, is sent from the home network SN1 to the selected radio control unit RNC1.

A fourth charging agreement pointer P2b is sent from the home network SN1 to the selected radio control unit RNC1 together with the above mentioned request B2b. The pointer P2b points out the charging parameters DP12 representing the selected charging agreement.

A speech connection for transparent transmission is established between the home network SN1 and the called mobile unit TE.

Information transmission takes place between the home network SN1 and the mobile unit TE on the established speech connection.

Registration in the first radio control unit RNC1 in the access network GRAN of measured information transmission properties in information transmission between the home network SN1 and the mobile unit TE on the established speech connection.

Conversion by means of the charging parameters DP12 of the measured information transmission properties to charging data DD2b.

Registration of the desired charging interval for the speech connection by means of the charging parameters DP12.

The mobile terminal TE now moves according to the implementation example from a base station handled by the first radio control unit RNC1 to a base station handled by a second radio control unit RNC2. The procedure then also comprises the following additional procedure steps:

The registration of the measured information properties is ended in the first radio control unit by the charging data DD2a and DD2b being sent from the first radio control unit RNC1 in the access network GRAN to the home network SN1.

The information transmission between the home network SN1 and the mobile unit TE proceeds on connections now established via the second radio control unit RNC2.

The registration of the measured information transmission properties between the home network SN1 and the mobile unit TE continues in the second radio control unit RNC2 in the access network GRAN.

Conversion of the measured information transmission properties to charging data DD2a and DD2b, respectively, which are stored in the second radio control unit RNC2. The conversion is done by means of the charging parameters DP10 and DP12, respectively.

Transmission of the charging data DD2a from the access network GRAN to the home network SN1 in accordance with the desired charging interval for the signalling connection.

Transmission of the charging data DD2b from the access network GRAN to the home network SN1 in accordance with the desired charging interval for the speech connection.

As a variation of the second implementation example it is also possible to let the mobile unit TE itself point to charging parameters DP10 instead of going via the service network SN, as shown above. As the mobile unit does not itself have the resources to select an appropriate charging agreement, in this case a predetermined agreement is pointed out. The selection of the agreement has already been agreed upon by the owner of the mobile unit TE and the operator of the home network SN1. In case of changes in the relationship between the home network operator and the mobile unit TE, the home network operator is thus able to change the content of the agreement to be pointed out by the mobile unit without the need to modify the mobile unit. The pointing out is shown in FIG. 4 and is done by a predetermined, so called fifth, charging agreement pointer P5 being sent from the mobile unit TE to the first radio control unit. The predetermined agreement, pointed out by the pointer P5, and in this example being the first charging agreement, is represented by the charging parameters DP10. After the first charging agreement has been pointed out the procedure continues in the same way as previously shown in the second implementation example. It is also possible, as a further variation of the second implementation example, to transmit the charging data from the first radio control unit to the second radio control unit after the mobile terminal TE has moved to the second radio control unit instead of the charging data being sent to the home network SN1 as shown above. It is also possible to let the mobile unit, via the SIM card, or another part of the service network specific part of the terminal, be provided with pointers to several different possible charging agreements, which may be selected dependently on the user's transmission request.

According to the first implementation example above the transmission of charging data has been requested, in accordance with the charging parameters, after the establishment has been finished. It is also possible to let the charging be requested after certain specified time intervals or at other specified points in time. Of course a number of different service networks can be connected to the access network. Neither the type of service network, the number of service networks or the number of radio control units affect the underlying idea of the invention or prevent the use of the invention.

Figure 5:
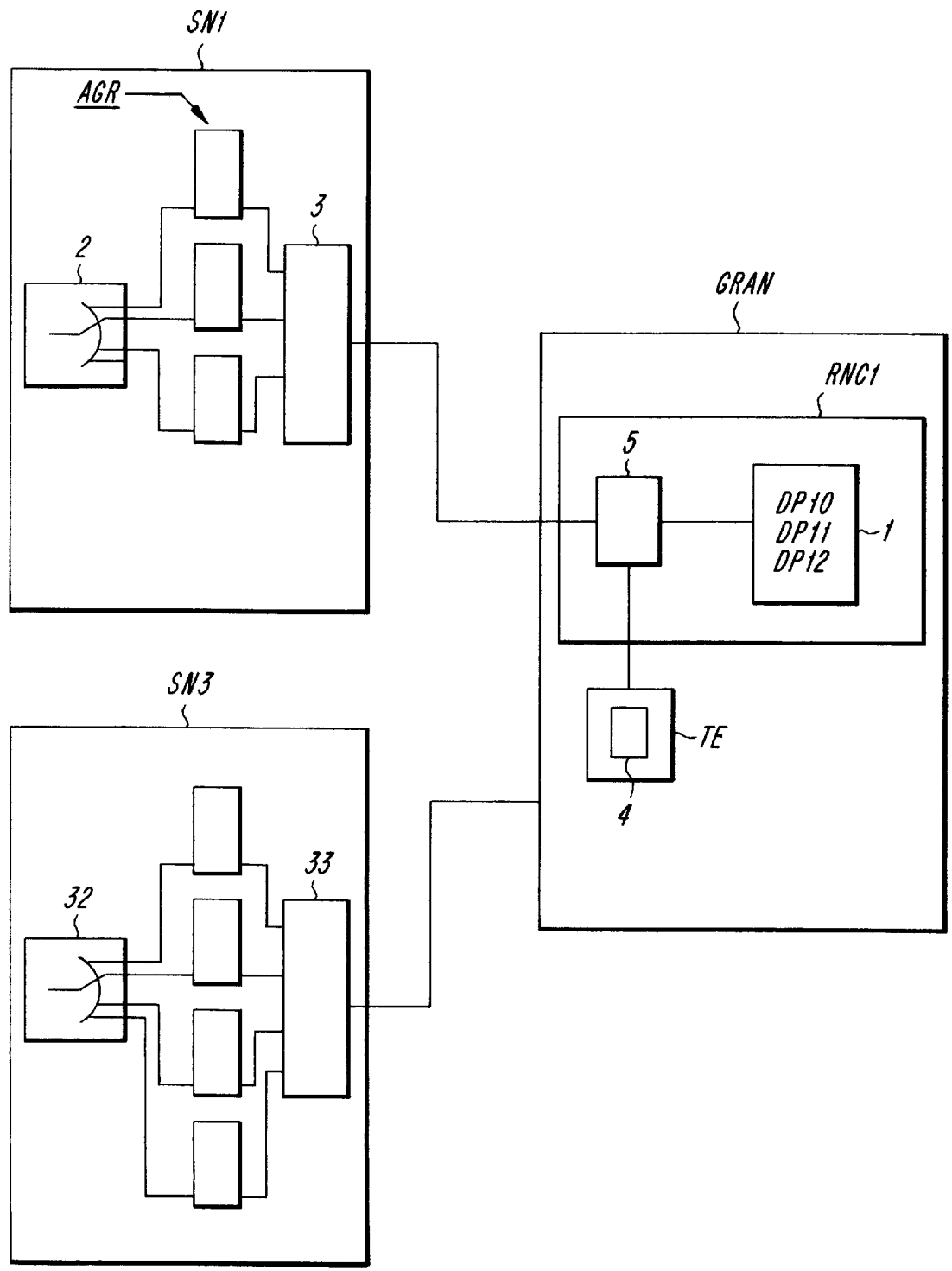
FIG. 5 shows an inventive apparatus for carrying out the methods shown above.

FIG. 6 shows an apparatus according to the invention. The apparatus according to the implementation example comprises the access network GRAN to which both the first service network SN1 and the third service network SN3 are connected. The previously mentioned second service network SN2 is not shown in the figure. The access network GRAN comprises the previously shown radio control unit RNC1, which constitutes a connection point between the access network and the first service network SN1. The apparatus also comprises storage means 1 for storing the charging parameters DP10, DP11 and DP12, representing different charging agreements AGR. The apparatus also comprises a selection unit 2, 32 in each of the service networks SN1, SN3. By means of the selection unit a charging agreement can be selected. The device also comprises a transmission unit 3, 33 in each service network SN1, SN3 for transmitting agreement pointers to radio control units RNC1 constituting connection points between the access network GRAN and the service networks SN1, SN3. In FIG. 5 only one radio transmission unit RNC1 is shown. The apparatus according to the invention comprises a mobile transmission unit 4 in a mobile telecommunications unit TE for transmitting an agreement pointer to radio control units constituting connection points between the access network and the service network with which a user of the mobile unit has signed an agreement. The apparatus also comprises a receiving unit 5 in each radio control unit RNC1 for receiving pointers and pointing out stored charging parameters DP10, DP11 and DP12 in the respective radio control unit.

I claim:

1. A charging method in a telecommunications system (TS) when information transmission takes place in a generic radio based access network (GRAN), to which at least two service networks (SN1, SN2, SN3) with different specified standards, are connected, said access network (GRAN) comprising radio control units (RNC1–RNC5), each of which constitutes a connection point between the access network (GRAN) and at least one of the service networks (SN1–SN3), each of said service networks being connected to one or more of the radio control units (RNC–RNC5), whereby charging parameters (DP10–DP12, DP20, DP30–DP33), representing charging agreements for the service networks' (SN1–SN3) utilization of the access network (GRAN), are stored in the radio control unit or units connected to the respective network, said method comprising the following additional steps:

Request from a user of a mobile terminal unit (TE) for the establishment of a connection, said mobile unit (TE) having a subscription to one of the service networks, the so called home network (SN1) and said connection being requested between the mobile unit (TE) and the home network (SN1);

Transmission of a so called fifth charging agreement pointer (P5) from the terminal (TE) to a first radio control unit (RNC1) constituting a connection point between the access network (GRAN) and the home network (SN1), said pointer pointing out charging parameters (DP10) representing a predetermined agreement;

Establishment of the connection in the access network (GRAN) between the home network (SN1) and the mobile unit (TE).

2. A charging method according to claim 1, comprising the following additional steps:

Information transmission between the home network (SN1) and the mobile unit (TE);

Registration in the first radio control unit (RNC1) in the access network (GRAN) of measured information transmission properties between the home network (SN1) and the mobile unit (TE); and Conversion by means of the charging data (DP10, DP11, DP12) of measured information transmission properties to charging data (DD1a, DD1b, DD2a, DD2b), which are stored in the first radio control unit (RNC1).

3. A charging method according to claim 2, comprising the following additional steps:

Moving the mobile unit (TE) from one base station, handled by the first radio control unit (RNC1) to a base station handled by a second radio control unit (RNC2);

Transmission of the charging data (DD1a, DD1b, DD2a, DD2b) from the access network (GRAN) to the home network (SN1);

Registration in the second radio control unit (RNC2) in the access network (GRAN) of measured information transmission properties between the home network (SN1) and the mobile unit (TE); and Conversion by means of the charging parameters (DP10, DP11, DP12) of measured information transmission properties to charging data (DD1a, DD1b, DD2a, DD2b) which are stored in the second radio control unit (RNC2).

4. A charging method according to claim 2, comprising the following additional steps:

Moving the mobile unit (TE) from one base station, handled by the first radio control unit (RNC1) to a base station handled by a second radio control unit (RNC2);

Transmission of the charging data (DD1a, DD1b, DD2a, DD2b) from the first radio control unit (RNC1) to the second radio control unit (RNC2);

Registration in the second radio control unit (RNC2) in the access network (GRAN) of measured information transmission properties between the home network (SN1) and the mobile unit (TE); and Conversion by means of the charging parameters (DP10, DP11, DP12) of measured information transmission properties to charging data (DD1a, DD1b, DD2a, DD2b) which are stored in the second radio control unit (RNC2).

5. A charging method according to claim 2, comprising the following additional steps:

Registration of the charging parameters (DP10, DP11, DP12) of the desired charging interval; and Transmission of the charging data (DD1a, DD1b, DD2a, DD2b) from the access network (GRAN) to the home network (SN1) in accordance with the desired charging interval.

6. A charging method according to claim 2, comprising the following additional steps:

Transmission of a connection reference (CREF1a, CREF1b) from the access network (GRAN) to the home network (SN1);

Registration in the home network (SN1) of information transmission for the connection related to the connection reference (CREF1a, CREF1b); and Comparison in the home network (SN1) of the received charging data (DD1a, DD1b, DD2a, DD2b) and the registered information transmission.

7. A charging method according to claim 2, comprising the following additional steps:

Transmission of a resource request (R1) for the desired traffic resources in the access network from the home network (SN1) to the access network (GRAN);

Decision in the access network (GRAN) as to whether the request for traffic resources can be met by the access network;

Transmission of a result message (RES) from the access network (GRAN) to the home network (SN1), said message comprising the result of the decision.

8. A charging method in a telecommunications system (TS) when information transmission takes place in a generic radio based access network (GRAN), to which at least two service networks (SN1, SN2, SN3) with different specified standards, are connected, said access network (GRAN) comprising radio control units (RNC1–RNC5), each of which constitutes a connection point between the access network (GRAN) and at least one of the service networks (SN1–SN3), each of said service networks being connected to one or more of the radio control units (RNC1–RNC5), whereby charging parameters (DP10–DP12, DP20, DP30–DP33) representing charging agreements for the service networks' (SN1–SN3) utilization of the access network (GRAN) are stored in the radio control unit or units connected to the respective network, said method comprising the following additional steps:

Request from a user of a telecommunications station (TA) in the telecommunications system (TS) for the establishment of a connection to a mobile unit (TE) in the access network (GRAN), said mobile unit (TE) having a subscription to one of the service networks, the so called home network (SN1);

Transmission of a transmission request (BO) for information transmission between the telecommunications station (TA) and the mobile terminal unit (TE), said request (BO) being sent from the telecommunications station (TA) to the home network (SN1);

Selection in the home network (SN1) of a charging agreement for the requested information transmission;

Transmission of a connection request (B1a, B1b) for the establishment of an information connection, to the mobile unit (TE) from the home network (SN1) to a first radio control unit (RNC1) constituting a connection point between the access network (GRAN) and the home network (SN1);

Transmission of a charging agreement pointer (P1a, P1b) from the home network (SN1) to the first radio control unit (RNC1), said pointer (P1a,P1b) pointing out charging parameters (DP11, DP12) representing the selected charging agreement;

Establishment of the connection in the access network (GRAN) between the home network (SN1) and the mobile unit (TE);

Information transmission between the home network (SN1) and the mobile unit (TE);

Registration in the first radio control unit (RNC1) in the access network (GRAN) of measured information transmission properties between the home network (SN1) and the mobile unit (TE); and Conversion by means of the charging data (DP10, DP 11, DP12) of measured information transmission properties to charging data (DD1a, DD1b, DD2a, DD2b), which are stored in the first radio control unit (RNC1).

9. A charging method according to claim 8, comprising the following additional steps:

Moving the mobile unit (TE) from one base station, handled by the first radio control unit (RNC1) to a base station handled by a second radio control unit (RNC2);

Transmission of the charging data (DD1a, DD1b, DD2a, DD2b) from the access network (GRAN) to the home network (SN1);

Registration in the second radio control unit (RNC2) in the access network (GRAN) of measured information transmission properties between the home network (SN1) and the mobile unit (TE);

Conversion by means of the charging parameters (DP10, DP11, DP12) of measured information transmission properties to charging data (DD1a, DD1b, DD2a, DD2b) which are stored in the second radio control unit (RNC2).

10. A charging method according to claim 8, comprising the following additional steps:

Moving the mobile unit (TE) from one base station, handled by the first radio control unit (RNC1) to a base station handled by a second radio control unit (RNC2);

Transmission of the charging data (DD1a, DD1b, DD2a, DD2b) from the first radio control unit (RNC1) to the second radio control unit (RNC2);

Registration in the second radio control unit (RNC2) in the access network (GRAN) of measured information transmission properties between the home network (SN1) and the mobile unit (TE);

Conversion by means of the charging parameters (DP10, DP11, DP12) of measured information transmission properties to charging data (DD1a, DD1b, DD2a, DD2b) which are stored in the second radio control unit (RNC2).

11. A charging method according to claim 8, comprising the following additional steps:

Registration of the charging parameters (DP10, DP11, DP12) of the desired charging interval;

Transmission of the charging data (DD1a, DD1b, DD2a, DD2b) from the access network (GRAN) to the home network (SN1) in accordance with the desired charging interval.

12. A charging method according to claim 8, comprising the following additional steps:

Transmission of a connection reference (CREF1a, CREF1b) from the access network (GRAN) to the home network (SN1);

Registration in the home network (SN1) of information transmission for the connection related to the connection reference (CREF1a, CREF1b);

Comparison in the home network (SN1) of the received charging data (DD1a, DD1b, DD2a, DD2b) and the registered information transmission.

13. A charging method according to claim 8, comprising the following additional steps:

Transmission of a resource request (R1) for the desired traffic resources in the access network from the home network (SN1) to the access network (GRAN);

Decision in the access network (GRAN) as to whether the request for traffic resources can be met by the access network; and Transmission of a result message (RES) from the access network (GRAN) to the home network (SN1), said message comprising the result of the decision.

14. A charging method in a telecommunications system (TS) when information transmission takes place in a generic radio based access network (GRAN), to which at least two service networks (SN1, SN2, SN3) with different specified standards, are connected, said access network (GRAN) comprising radio control units (RNC1–RNC5), each of which constitutes a connection point between the access network (GRAN) and at least one of the service networks (SN1–SN3), each of said service networks being connected to one or more of the radio control units (RNC1–RNC5), whereby charging parameters (DP10–DP12, DP20, DP30–DP33) representing charging agreements for the service networks' (SN1–SN3) utilization of the access network (GRAN) are stored in the radio control unit or units connected to the respective network, said method comprising the following additional steps:

Request from a user of a telecommunications station (TA) in the telecommunications system (TS) for the establishment of a connection to a mobile unit (TE) in the access network (GRAN), said mobile unit (TE) having a subscription to one of the service networks, the so called home network (SN1);

Transmission of a transmission request (B0) for information transmission between the telecommunications station (TA) and the mobile terminal unit (TE), said request (BO) being sent from the telecommunications station (TA) to the home network (SN1);

Selection in the home network (SN1) of a charging agreement for the requested information transmission;

Transmission of a connection request (B1a, B1b) for the establishment of an information connection, to the mobile unit (TE) from the home network (SN1) to a first radio control unit (RNC1) constituting a connection point between the access network (GRAN) and the home network (SN1);

Transmission of a charging agreement pointer (P1a, P1b) from the home network (SN1) to the first radio control unit (RNC1), said pointer (P1a,P1b) pointing out charging parameters (DP11, DP12) representing the selected charging agreement;

Establishment of the connection in the access network (GRAN) between the home network (SN1) and the mobile unit (TE);

Transmission of a resource request (R1) for the desired traffic resources in the access network from the home network (SN1) to the access network (GRAN);

Decision in the access network (GRAN) as to whether the request for traffic resources can be met by the access network; and Transmission of a result message (RES) from the access network (GRAN) to the home network (SN1), said message comprising the result of the decision.

15. An apparatus in a telecommunications system (TS) when information transmission is taking place in a generic radio based access network (GRAN), to which at least two service networks (SN1, SN2, SN3) with different specified standards are connected, said access network (GRAN) comprising radio control units (RNC1–RNC5), each of which constitutes a connection point between the access network (GRAN) and at least one of the service network (SN1–SN3), each of said service networks being connected to one or more of the radio control units (RNC1–RNC5), said apparatus comprising:

Storage means (1) for storing charging parameters (DP10–DP12, DP20, DP30–DP33) representing charging agreements for the service networks' (SN1–SN3) utilization of the access networks (GRAN), in the radio control unit or units (RNC1-RNC5) connected to the respective network;

A selection unit (2) in each of the service networks (SN1–SN3) for selecting a charging agreement when an information transmission has been requested;

A transmission unit (3) in each of the service networks (SN1–SN3) for transmitting charging agreement pointers (P1a, P1b, P2a, P2b, P5) to radio control units (RNC1–RNC5) constituting connection points between the access network and the service networks;

A mobile transmitter unit (4) in a mobile telecommunications unit (TE) for transmitting a charging agreement pointer (P5) to a radio transmission unit or units (RNC1–RNC5) constituting connection points between the access network and the service network of the mobile telecommunications unit; and A receiver unit (5) in each of the radio control units (RNC1 –RNC5) for receiving pointers (P1a, P1b, P2a, P2b, P5) and pointing out stored charging parameters.

16. A charging method in a telecommunications system (TS) when information transmission takes place in a generic radio based access network (GRAN), to which at least two service networks (SN1, SN2, SN3) with different specified standards, are connected, said access network (GRAN) comprising radio control units (RNC1–RNC5), each of which constitutes a connection point between the access network (GRAN) and at least one of the service networks (SN1–SN3), each of said service networks being connected to one or more of the radio control units (RNC1–RNC5), whereby charging parameters (DP10–DP12, DP20, DP30–DP33) representing charging agreements for the service networks' (SN1–SN3) utilization of the access network (GRAN) are stored in the radio control unit or units connected to the respective network, said method comprising the following additional steps:

Request from a user of a mobile terminal unit (TE) for the establishment of a connection, said mobile unit (TE) having a subscription to one of the service networks, the so called home network (SN1), and said connection being requested to be connected between the mobile unit (TE) and the home network (SN1);

Transmission of a so called third connection request (B2a) for information transmission between the mobile unit (TE) and the home network (SN1), said request being sent from the mobile unit (TE) via the signalling nodes of the access network to the home network (SN1);

Selection in the home network (SN1) of a charging agreement for the requested information transmission;

Transmission of a so called third charging agreement pointer (P2a) from the home network (SN1) to a first radio control unit (RNC1) constituting a connection point between the access network (GRAN) and the home network (SN1), said pointers pointing out charging parameters (DP10) representing the selected charging agreement;

Establishment of the connection in the access network (GRAN) between the home network (SN1) and the mobile unit (TE);

Information transmission between the home network (SN1) and the mobile unit (TE);

Registration in the first radio control unit (RNC1) in the access network (GRAN) of measured information transmission properties between the home network (SN1) and the mobile unit (TE); and Conversion by means of the charging data (DP10, DP11, DP12) of measured information transmission properties to charging data (DD1a, DD1b, DD2a, DD2b), which are stored in the first radio control unit (RNC1).

17. A charging method according to claim 16, comprising the following additional steps:

Moving the mobile unit (TE) from one base station, handled by the first radio control unit (RNC1) to a base station handled by a second radio control unit (RNC2);

Transmission of the charging data (DD1a, DD1b, DD2a, DD2b) from the access network (GRAN) to the home network (SN1);

Registration in the second radio control unit (RNC2) in the access network (GRAN) of measured information transmission properties between the home network (SN1) and the mobile unit (TE); and Conversion by means of the charging parameters (DP10, DP11, DP12) of measured information transmission properties to charging data (DD1a, DD1b, DD2a, DD2b) which are stored in the second radio control unit (RNC2).

18. A charging method according to claim 16, comprising the following additional steps:

Moving the mobile unit (TE) from one base station, handled by the first radio control unit (RNC1) to a base station handled by a second radio control unit (RNC2);

Transmission of the charging data (DD1a, DD1b, DD2a, DD2b) from the first radio control unit (RNC1) to the second radio control unit (RNC2);

Registration in the second radio control unit (RNC2) in the access network (GRAN) of measured information transmission properties between the home network (SN1) and the mobile unit (TE); and Conversion by means of the charging parameters (DP10, DP11, DP12) of measured information transmission properties to charging data (DD1a, DD1b, DD2a, DD2b) which are stored in the second radio control unit (RNC2).

19. A charging method according to claim 16, comprising the following additional steps:

Registration of the charging parameters (DP10, DP11, DP12) of the desired charging interval; and Transmission of the charging data (DD1a, DD1b, DD2a, DD2b) from the access network (GRAN) to the home network (SN1) in accordance with the desired charging interval.

20. A charging method according to claim 16, comprising the following additional steps:

Transmission of a connection reference (CREF1a, CREF1b) from the access network (GRAN) to the home network (SN1);

Registration in the home network (SN1) of information transmission for the connection related to the connection reference (CREF1a, CREF1b); and Comparison in the home network (SN1) of the received charging data (DD1a, DD 1b, DD2a, DD2b) and the registered information transmission.

21. A charging method according to claim 16, comprising the following additional steps:

Transmission of a resource request (R1) for the desired traffic resources in the access network from the home network (SN1) to the access network (GRAN);

Decision in the access network (GRAN) as to whether the request for traffic resources can be met by the access network; and Transmission of a result message (RES) from the access network (GRAN) to the home network (SN1), said message comprising the result of the decision.

22. A charging method according to claim 16 comprising the following additional steps:

Transmission of a so called-fourth connection request (B2b) for information transmission between the mobile unit (TE) and the home network (SN1), said request being transmitted from the home network (SN1) to the first radio control unit (RNC1);

Selection in the home network (SN1) of a charging agreement for the requested information transmission;

Transmission of a so called fourth charging pointer (P2b) from the home network (SN1) to a first radio control unit (RNC1), said pointer (P2b) pointing out charging parameters (DP12) representing the selected charging agreement; and Establishment of the connection in the access network (GRAN) between the home network (SN1) and the mobile unit (TE).

23. A charging method according to claim 22, comprising the following additional steps:

Moving the mobile unit (TE) from one base station, handled by the first radio control unit (RNC1) to a base station handled by a second radio control unit (RNC2);

Transmission of the charging data (DD1a, DD1b, DD2a, DD2b) from the access network (GRAN) to the home network (SN1);

Registration in the second radio control unit (RNC2) in the access network (GRAN) of measured information transmission properties between the home network (SN1) and the mobile unit (TE); and Conversion by means of the charging parameters (DP10, DP11, DP12) of measured information transmission properties to charging data (DD1a, DD1b, DD2a, DD2b) which are stored in the second radio control unit (RNC2).

24. A charging method according to claim 22, comprising the following additional steps:

Moving the mobile unit (TE) from one base station, handled by the first radio control unit (RNC1) to a base station handled by a second radio control unit (RNC2);

Transmission of the charging data (DD1a, DD1b, DD2a, DD2b) from the first radio control unit (RNC1) to the second radio control unit (RNC2);

Registration in the second radio control unit (RNC2) in the access network (GRAN) of measured information transmission properties between the home network (SN1) and the mobile unit (TE); and Conversion by means of the charging parameters (DP10, DP11, DP12) of measured information transmission properties to charging data (DD1a, DD1b, DD2a, DD2b) which are stored in the second radio control unit (RNC2).

25. A charging method according to claim 22, comprising the following additional steps:

Registration of the charging parameters (DP10, DP11, DP12) of the desired charging interval; and Transmission of the charging data (DD1a, DD1b, DD2a, DD2b) from the access network (GRAN) to the home network (SN1) in accordance with the desired charging interval.

26. A charging method according to claim 22, comprising the following additional steps:

Transmission of a connection reference (CREF1a, CREF1b) from the access network (GRAN) to the home network (SN1);

Registration in the home network (SN1) of information transmission for the connection related to the connection reference (CREF1a, CREF1b); and Comparison in the home network (SN1) of the received charging data (DD1a, DD 1b, DD2a, DD2b) and the registered information transmission.

27. A charging method according to claim 22, comprising the following additional steps:

Transmission of a resource request (R1) for the desired traffic resources in the access network from the home network (SN1) to the access network (GRAN);

Decision in the access network (GRAN) as to whether the request for traffic resources can be met by the access network;

Transmission of a result message (RES) from the access network (GRAN) to the home network (SN1), said message comprising the result of the decision.

* * * * *